United States Patent
Swier et al.

(10) Patent No.: US 12,378,435 B2
(45) Date of Patent: Aug. 5, 2025

(54) WEATHERABLE AND DURABLE COATING COMPOSITIONS

(71) Applicants: Dow Global Technologies LLC, Midland, MI (US); Dow Silicones Corporation, Midland, MI (US)

(72) Inventors: Steven Swier, Midland, MI (US); Gary M. Wieber, Midland, MI (US); Erin B. Vogel, Midland, MI (US); John B. Horstman, Midland, MI (US); Susan M. Machelski, Midland, MI (US)

(73) Assignees: Dow Global Technologies LLC, Midland, MI (US); Dow Silicones Corporation, Midland, MI (US)

( * ) Notice: Subject to any disclaimer, the term of this patent is extended or adjusted under 35 U.S.C. 154(b) by 637 days.

(21) Appl. No.: 17/775,918

(22) PCT Filed: Nov. 12, 2020

(86) PCT No.: PCT/US2020/060078
§ 371 (c)(1),
(2) Date: May 11, 2022

(87) PCT Pub. No.: WO2021/113042
PCT Pub. Date: Jun. 10, 2021

(65) Prior Publication Data
US 2022/0380626 A1    Dec. 1, 2022

Related U.S. Application Data

(60) Provisional application No. 62/944,005, filed on Dec. 5, 2019.

(51) Int. Cl.
C09D 183/00 (2006.01)
C09D 133/08 (2006.01)
C09D 183/08 (2006.01)

(52) U.S. Cl.
CPC ......... *C09D 183/08* (2013.01); *C09D 133/08* (2013.01)

(58) Field of Classification Search
CPC .................. C09D 183/08; C09D 133/08
USPC ...................................... 106/287.14
See application file for complete search history.

(56) References Cited

U.S. PATENT DOCUMENTS

| | | |
|---|---|---|
| 5,925,779 A | 7/1999 | Cray et al. |
| 8,193,293 B2 | 6/2012 | Martz et al. |
| 8,871,888 B2 | 10/2014 | Mowrer et al. |
| 2002/0167546 A1 | 11/2002 | Kimbell et al. |
| 2004/0143060 A1 | 7/2004 | Sakugawa |
| 2005/0148752 A1* | 7/2005 | Klaassens ......... C08G 59/4085 528/38 |
| 2018/0355189 A1 | 12/2018 | Huang et al. |
| 2021/0230373 A1 | 7/2021 | Jenkner et al. |

FOREIGN PATENT DOCUMENTS

| | | | | |
|---|---|---|---|---|
| CN | 106381084 A | * | 2/2017 | ............ C08F 220/14 |
| EP | 887366 A2 | | 12/1998 | |
| JP | 2002167546 A | | 6/2002 | |
| WO | 2001051575 A1 | | 7/2001 | |
| WO | 2021113043 A1 | | 6/2021 | |

OTHER PUBLICATIONS

Ready, T. E.; Chauhan, Bhanu P, S.; BOUDj Ouk, P. S.; Macromol. Rapid Comm. 2001, 22, 654-657.
Search Report from corresponding Chinese Application No. 202080079345.4 dated May 27, 2023.

\* cited by examiner

*Primary Examiner* — James E McDonough
(74) *Attorney, Agent, or Firm* — Karl Stauss

(57) ABSTRACT

A curable coating composition is provided having multi-functionalized acrylic copolymer and amino-functional silicone resin curing agents. The acrylic copolymer of the curable coating composition has, in polymerized form, epoxy functionalized groups and cure compatibility groups and the amino-functional silicone resin is an alkoxy functional siloxane, which optionally is derived from sterically hindered alcohol-amine precursor moieties. The coating compositions are useful in the field of superior weatherable and durable coatings and are useful to replace isocyanate-containing polyurethane based coatings. Also provided are coated articles produced from the curable composition.

11 Claims, No Drawings

WEATHERABLE AND DURABLE COATING COMPOSITIONS

This invention relates to curable coating compositions having multi-functionalized acrylic copolymer and amino-functional silicone resin curing agents. More particularly the acrylic copolymer has, in polymerized form, epoxy functionalized groups and cure compatibility groups and the amino-functional silicone resin is an alkoxy functional siloxane, which optionally is derived from sterically hindered alcohol-amine precursor moieties. The coating compositions are useful in the field of superior weatherable and durable coatings and are useful to replace isocyanate-containing polyurethane based coatings.

Isocyanate-containing polyurethane based coatings are used in applications where superior weatherability and durability are required. However, manufacturers and consumers desire to move to isocyanate-free coatings to limit exposure to such materials; while providing weatherability in addition to chemical and corrosion resistance. In applications where epoxy coatings are used to protect metal, but require good color and gloss retention, the epoxy coatings are further coated over with a topcoat, often a polyurethane. Other coatings derived from epoxy resins, such as polysiloxane-epoxy coatings, are dependent on humidity for cure and often become brittle as the coating continues to cure.

Amino-functional polysiloxanes with amine functionality attached through Si—O—C bonds typically exhibit stability concerns in the presence of moisture, as the SiOC bond is susceptible to hydrolysis resulting in regeneration of the original amine alcohol and silanol. Hydrolysis affects both the appearance of the protective coating, as the alcohol amines are typically not compatible with the host siloxane resin and organic epoxy hardener, and the performance of the protective coating, as the level of chemical cross-linking will be greatly limited if the SiOC bond is severed.

United States Patent Publication 2005/0148752 A1 discloses amino-functional polysiloxanes possessing a Si—O—C bond between the polymeric backbone and the functional group; and includes epoxy-polysiloxane compositions. US2005/0148752 A1 fails to identify coatings comprising acrylic copolymers. Moreover, US2005/0148752 A1 fails to distinguish benefits associated with use of siloxanes derived from sterically hindered alcohol-amine precursor moieties from non-sterically hindered moieties.

U.S. Pat. No. 8,193,293 discloses a low temperature, ambient curable coating composition comprising an amino-functional polysiloxane; a polysiloxane resin which is the reaction product of a polysiloxane containing silicon hydride and a hydroxyl functional group-containing material having two or more unsaturated bonds capable of undergoing hydrosilylation reaction; and a polyepoxide.

U.S. Pat. No. 8,871,888 discloses a high solids, one-component, storage stable coating composition comprising an epoxy resin comprising more than one 1,2-epoxy groups per molecule; a hydrocarbon compound having a softening point of from 50° C. to 140° C.; an alkoxy-functional and/or silanol-functional silicone; and a ketimine curing agent comprising a reaction product of reactants comprising a polyalkyldiamine component and a ketone component.

International Patent Publication WO 01/51575 A1 discloses an ambient temperature curing coating composition comprising a polysiloxane with alkyl, aryl, alkoxy, reactive glycidoxy and $OSi(OR)_3$ groups; a glycidyl-functional acrylic polymer; and a hardener. The polysiloxane does not contain amine functionality.

Japanese Patent Publication 2002-167546 A discloses a corrosion proof coating material composition for single-coating finishing comprising (A) an acrylic resin, (B) an epoxy resin having at least two epoxy groups, (C) an organosilane compound, and (D) an aminosilane-containing amine curing agent, and as the compounding ratios of the acrylic resin (A), the epoxy resin (B) and the organosilane compound (C), the component (A) is 5-65 wt. %; the component (B) is 30-90 wt. %; and the component (C) is 5-65 wt. %, each based on the total amount of the solid contents of these resins.

What is needed is a cost effective coating composition that exhibits good stability in the presence of moisture and offers a good balance of properties including UV protection, corrosion resistance, good dry times and chemical resistance; all while using a minimum of materials.

The present invention provides a curable coating composition comprising:

(1) an amino-functional silicone resin comprising in polymerized form, structural units of:
   (i) $(R_3SiO_{1/2})_a$;
   (ii) $(R_2Si(OR')_xO_{(2-x)/2})_b$;
   (iii) $(RSi(OR')_yO_{(3-y)/2})_c$; and
   (iv) $(Si(OR')_zO_{(4-z)/2})_d$ wherein each R' is hydrogen, an alkyl group or a functionalized alkyl group, provided that at least 5 mole percent of all R' groups are amine containing groups of the formula: —$R_a$—$NHR_b$; wherein $R_a$ is an alkyl group or an aryl-containing group derived from an amino alcohol and $R_b$ is hydrogen, an alkyl group, or an aryl group; wherein a+b+c+d=1.00 (100 mole percent); x is either 0 or 1; y is either 0, 1 or 2; and z is either 0, 1, 2, or 3; wherein each R is independently hydrogen, an alkyl group, or an aryl group; and the —NH— equivalent mass of the amino-functional silicone resin is from 50 to 750; and (2) an acrylic copolymer which has, in polymerized form, epoxy functionalized groups and cure compatibility groups; and wherein the coating composition has a molar ratio of amine NH functionality to epoxy functionality in the range of from 0.5 to 1.3. The present invention further provides a coated article comprising one or more layers of the cured coating composition.

The term "mole percent" can also be represented as a "mole fraction" whereby 1 mole percent equals a mole fraction of 0.01. The terms "mole percent" and "mole fraction" are on a basis of Si content in a material totaling 100 mol % (i.e. 1.00 mole fraction). For each range presented in the present invention, the lower limit of the range and the upper limit of the range are separable and combinable in any fashion with other lower or upper limits; including in combinations with the lower and upper limits for the ranges of additional components identified in the present invention. All individual values and subranges are included herein and disclosed herein.

Amino-Functional Silicone Resin

The amino-functional silicone resin of the present invention can be described as a siloxane structure having siloxane bonds (—Si—O—Si—) with amine functionality attached through Si—O—C bonds to Si units on the siloxane structure, and comprises in polymerized form, structural units of:
   (i) $(R_3SiO_{1/2})_a$;
   (ii) $(R_2Si(OR')_xO_{(2-x)/2})_b$;
   (iii) $(RSi(OR')_yO_{(3-y)/2})_c$; and
   (iv) $(Si(OR')_zO_{(4-z)/2})_d$ wherein each R' is hydrogen, an alkyl group or a functionalized alkyl group, provided that at least 5 mole percent of all R' groups are amine containing groups of the formula: —$R_a$—$NHR_b$;

wherein $R_a$ is an alkyl group or an aryl-containing group derived from an amino alcohol and $R_b$ is hydrogen, an alkyl group, or an aryl group;

wherein a+b+c+d=1.00 (100 mole percent); x is either 0 or 1; y is either 0, 1 or 2; and z is either 0, 1, 2, or 3;

wherein each R is independently hydrogen, an alkyl group, or an aryl group; and the —NH— equivalent mass of the amino-functional silicone resin is from 50 to 1000, preferably 50 to 750, more preferred 80 to 900, even more preferred 100 to 800, and most preferred 100-700.

The amount of all R' groups which are amine containing groups of the formula: —$R_a$—$NHR_b$ can be as low as 5 mole percent, 10 mole percent or 20 mole percent and can independently be as high as 100 mole percent, 50 mole percent or 30 mole percent, with preferred ranges of 5 to 42 mole percent and 20 to 30 mole percent; provided that the —NH— equivalent mass of the amino-functional silicone resin is within the identified ranges. $R_a$ is derived from an amino alcohol represented by the formula HO—$R_a$—$NHR_b$, wherein $R_a$ is an alkyl group or an aryl-containing group. Preferably $R_a$ is derived from an amino alcohol which is selected from the group of amino alcohols which (a) have steric hindrance around the COH moiety; (b) are secondary or tertiary alcohols; or (c) are mixtures thereof.

In describing silicone resins, $R_3SiO_{1/2}$ is also referred to as M, $R_2SiO_{2/2}$ is also referred to as D, $RSiO_{3/2}$ is also referred to as T, and $SiO_{4/2}$ is also referred to as Q. In the event a superscript is used next to the M, D, T or Q designations, it refers to the type of R group(s) present. For example, $D^{Ph}$ mean that one of the two R groups is a phenyl group. Any R group(s) not described by superscripts is to be understood by those skilled in the art as being methyl groups, unless the specific description of the polymer indicates otherwise. The —NH— equivalent mass of the amino-functional silicone resin is determined by obtaining a $^{13}$C-NMR spectrum of a known amount of solution of, or neat sample of, the amino-functional silicone resin and quantifying the peaks associated with the amino-functional Si units of the amino-functional silicone resin relative to those associated with a known amount of an internal standard (typically 1,4-dioxane), then adjusting for solvent content present in the sample, if any, as determined by gas chromatography. The amino-functional silicone resin is in the form of a neat liquid, solution, or meltable solid. Each subscript a, b, c or d is an average value across the distribution of units making up the material and is determined for any given material by using calculations based on NMR spectroscopic data (typically $^{29}$Si-NMR and $^{13}$C-NMR, alternatively $^{29}$Si-NMR and $^1$H-NMR).

The amino-functional silicone resin of the present invention can be produced by reacting (1) a silicone resin having hydroxy, alkoxy or aryloxy functionality with (2) an amino alcohol. The silicone resin having hydroxy, alkoxy or aryloxy functionality can be derived from polysiloxanes, alkoxysilanes, or chlorosilanes. The hydroxy, alkoxy or aryloxy functionality of the silicone resin (1) composition is sometimes referred to as the "OZ" content and is stated in terms of mole percent. Non-limiting examples of suitable silicone resins include DOWSIL™ 3074 and DOWSIL™ 3037, available from The Dow Chemical Company; Shin-Etsu Silicone KR-213 and KR-510, available from Shin-Etsu Chemical Co., Ltd.; and SILRES® IC232 and SILRES® SY231, available from Wacker Chemie AG.

The amino alcohol can be represented by the formula HO—$R_a$—$NHR_b$, as previously described. Non-limiting examples of suitable amino alcohols include 2-amino-1-ethanol, 1-amino-2-propanol, 1-amino-2-methylpropan-2-ol, 2-amino-1-propanol, 3-amino-1-propanol, 2-amino-1-butanol, 3-amino-1-butanol, neopentanolamine (3-amino-2,2-dimethyl-1-propanol), 2-amino-1-methyl-1-propanol, 2-amino-2-methyl-1-propanol, 2-amino-2-ethylpropane-1,3-diol, 2-amino-2-methylpropane-1,3-diol, 5-amino-1-pentanol, 1,2-dimethylethanolamine, 3-alloxy-2-hydroxy-propylamine, 1-amino-2-methyl-pentanol, N-methylethanolamine, N-hydroxyethylpropanediamine, N-cyclohexylethanolamine, p-(beta-hydroxyethyl)-aniline, N-(beta-hydroxypropyl)-N'-(beta-aminoethyl)piperazine, 2-hydroxy-3-(m-ethylphenoxy)propylamine, 2-hydroxy-2-phenylethyl amine, tris(hydroxymethyl)aminomethane, 2-aminobenzyl alcohol, 3-aminobenzyl alcohol, 3-amino-o-cresol, 4-amino-o-cresol, 5-amino-o-cresol, 2-amino-p-cresol, 4-amino-m-cresol, 6-amino-m-cresol, 1-amino-1-cyclopentane methanol, 2-(2-aminoethoxy)ethanol, 2-(2-aminoethylamino) ethanol, 6-amino-1-hexanol, 3-(1-hydroxyethyl)aniline, 2-amino-1-phenylethanol, 1-aminomethyl-1-cyclohexanol, 8-amino-2-naphthol, 2-amino-phenethyl alcohol, 4-amino-phenethyl alcohol, 3-(alpha-hydroxyethyl)aniline, Mannich bases, the reaction product of an aminoalcohol with cis-2-pentenenitrile followed by an hydrogenation step, aminophenols such as p-aminophenol, tyrosine, tyramine and the like, epoxy-amine adducts and mixtures thereof. Preferred amino alcohols include without limitation, 1-amino-2-propanol and 1-amino-2-methylpropan-2-ol.

NMR: The compositions of the various alkoxy-containing amino-functional silicone resin compositions are determined utilizing NMR. The nuclear magnetic resonance (NMR) analysis is done using a Mercury 400 MHz super conducting spectrometer. The instrument uses a silicon-free probe.

Alkoxy Content Alkoxy content is calculated by one of two methods. Method one uses the ratio of alkoxy to phenyl as measured from $^{13}$C NMR and then multiplying this ratio to the phenyl content as measured from $^{29}$Si NMR. The result obtained is in mole percent (mol %). Method 2 uses the internal standard deuterated chloroform in $^{13}$C NMR. Using the weights of resin and chloroform added to the NMR sample, the weight % alkoxy is determined. Then the mole alkoxy is calculated using this information in conjunction with the composition obtained from $^{29}$Si NMR.

Molecular Weight—Resins that are analyzed for molecular weight (Mn and Mw) are done using gel permeation chromatography. The samples are prepared in THE at 0.5% concentration, capped with acetic anhydride, filtered and analyzed against polystyrene standards using RI detection. The columns are two 300 mm 5 micrometer Mixed C with a 50 mm guard column. The flow rate is 1 ml/min.

The alkyl groups are illustrated by, but not limited to, methyl, ethyl, propyl, butyl, hexyl, octyl, decyl, dodecyl, hexadecyl, and octadecyl with the alkyl group typically being methyl. The aryl groups are illustrated by, but not limited to, phenyl, naphthyl, benzyl, tolyl, xylyl, xenyl, methylphenyl, 2-phenylethyl, 2-phenyl-2-methylethyl, chlorophenyl, bromophenyl and fluorophenyl with the aryl group typically being phenyl.

The silicone resin having hydroxy, alkoxy or aryloxy functionality is synthesized according to polymerization methods known in the art. Non-limiting, illustrative polymerization methods are disclosed in United States Patent Publication 2005/0148752 A1.

Multi-Functionalized Acrylic Copolymer Description

The multi-functionalized acrylic copolymer means a copolymer including a majority amount of copolymerized (meth)acrylic esters, including in polymerized form through the acrylate linkages, epoxy functionalized groups and cure compatibility groups, which retain their functionality on the backbone of the acrylic copolymer. Preferably the multi-functionalized acrylic copolymer is a polar material due in part to the presence of the cure compatibility groups, which while not being bound by any theory, is believed to aid in compatibility with the polar amino-functional silicone resin. This compatibility is best seen by the reduction of haze in the cured coating composition. As used herein, the use of the term "(meth)" followed by another term such as acrylate refers to both acrylates and methacrylates. For example, the term "(meth)acrylate" refers to either acrylate or methacrylate. Similarly, the term "(meth)acrylic acid" refers to methacrylic acid or acrylic acid. The acrylic copolymer is prepared via free radical polymerization in solvent, such as xylene, in which monomers, initiators, optionally chain transfer agents and solvent can be charged into a vessel and reacted at about 60° to 175° C. for about 1-6 hours to form the polymer. Typical solvents which can be used to prepare the acrylic copolymers are the following: toluene, ethyl acetate, butyl acetate, acetone, methyl isobutyl ketone, methylethyl ketone, ethyl alcohol, mineral spirits, ethylene glycol monoethyl ether acetate, and other aliphatic, cycloaliphatic and aromatic hydrocarbon, esters, ethers, ketones and alcohols which are conveniently used. Alternatively the acrylic copolymer can be prepared through free radical emulsion or suspension addition polymerization or by dispersion of a pre-formed polymer under shear into an aqueous medium. Preferably, the acrylic copolymer of the present invention is solvent-borne.

Monomers suitable for the preparation of acrylic copolymers include (meth)acrylates such as methyl (meth)acrylate, ethyl (meth)acrylate, butyl (meth)acrylate, 2-ethylhexyl (meth)acrylate, and combinations thereof. Additional monomers may be used to prepare the acrylic copolymer including carboxylic acid monomers such as (meth)acrylic acid and itaconic acid, and salts thereof; sulfonic acid monomers such as sodium styrene sulfonate and acrylamido-methyl-propane sulfonate and salts thereof; and phosphoric acid monomers such as phosphoethylmethacrylate and salts thereof. Monomers such as styrene, acrylonitrile, acetoacetoxyethyl methacrylate (AAEM), and alkoxysilane functional (meth)acrylate, as well as monomers capable of imparting co-curable functionality such as glycidyl (meth)acrylates and hydroxyalkyl (meth)acrylates, may also be used in the preparation of the acrylic copolymer. In certain embodiments, it may be advantageous to incorporate into the acrylic copolymer small amounts of copolymerized multi-ethylenically unsaturated monomer groups, including allyl (meth)acrylate, diallyl phthalate, 1,4-butylene glycol di(meth)acrylate, 1,2-ethylene glycol di(meth)acrylate, 1,6-hexanediol di(meth)acrylate, and divinyl benzene. It may also be advantageous to incorporate such monomer groups non-uniformly into the polymer to form multiphase polymer particles to create a core-shell, hemispherical, or occluded morphology. Chain transfer agents may be used to prepare these acrylic copolymers, examples of which include dodecylmercaptan, 2-mercaptoethanol, mercaptotrialkoxy silane, butylmercaptopropionate, methylmercaptopropionate, and mercaptopropionic acid. Initiators may be used to prepare these acrylic copolymers, examples of which include peroxy and azo compounds.

The epoxy functionalized groups of the acrylic copolymer comprise glycidyl groups such as glycidyl methacrylate (GMA) or glycidyl acrylate; with preference to GMA. The cure compatibility groups of the acrylic copolymer comprise monomer groups, in polymerized form, that contain one or more of alcohol (OH) functionality, a phenolic group, a silicone group such as with the monomer 3-(trimethoxysilyl) propyl methacrylate (MATS), a tertiary amine or an acid group that is either pendant to the backbone (as with acrylic monomers) or attached as an end group, such as where an OH functional chain transfer agent is used in the polymerization. Preferably the cure compatibility group is hydroxyethyl (meth)acrylate (HEMA or HEA). Preferably the acrylic copolymer is synthesized from monomers including GMA, HEMA, methyl methacrylate (MMA), and 2-ethylhexyl acrylate (EHA).

The acrylic copolymer contains 30-80% glycidyl (meth) acrylate monomer units by weight based on the weight of the total monomer units added to produce the copolymer; preferably 40-60% glycidyl (meth)acrylate monomer; and most preferably greater than 30% glycidyl (meth)acrylate monomer on the bottom of the range. The acrylic copolymer contains up to 20% cure compatibility group monomer units by weight based on the weight of the total monomer units added to produce the copolymer; preferably up to 10% cure compatibility group monomer units; preferably up to 8% cure compatibility group monomer units; and preferably greater than to 2% cure compatibility group monomer units, with a preferred range of 5 to 10%. The upper bound of the cure compatibility group is determined primarily by the viscosity of the copolymer when incorporating HEMA with GMA functional groups. Theoretically it is possible to have a higher content of cure compatibility groups when using other monomers such as with the combination of HEA and glycidyl acrylate. The acrylic copolymer contains an epoxy equivalent weight (EEW) in the range of 200-600 g/mol epoxy as determined in accordance with ASTM D1652; preferably with a lower limit greater than 250 g/mol epoxy, more preferably greater than 275 g/mol epoxy; and preferably with an upper limit less than 500 g/mol epoxy, more preferably less than 450 g/mol epoxy; and with a preferred range of 300-400 g/mol epoxy.

The acrylic copolymer has a calculated glass transition temperature ("Tg") of eighty degrees Celsius (80° C.) or less, preferably 30° C. or less, most preferably 15° C. or less, with a preferred range of −40° C. to 10° C. The Tg is arrived at by selection of monomers and amounts of monomers to achieve the desired polymer Tg, as is well known in the art. Tgs of polymers are measured using Dynamic Scanning calorimetry.

The acrylic copolymer solutions are viscous liquids with a viscosity in the range of 500 centipoise (cP) to 8,000 cP at room temperature (25° C.) at around 70% solids. The acrylic copolymer of the present invention has a number average molecular weight of from 500 to 10,000 g/mol, preferably 1,000-5,000 g/mol or more, or, more preferably, 4,000 g/mol or less, as measured by Gel Permeation Chromatography using polystyrene standards.

Coating Composition Description

The coating composition of the present invention comprises the acrylic copolymer and the amino-functional silicone resin. The molar ratio of amine NH functionality to epoxy functionality is in the range of from 0.5 to 1.3; preferably 0.8 to 1. Preferably it is best to avoid an excess of amine groups as this can lead to amine blush which is bad for exterior durability. Amine blush causes a loss of gloss upon exposure to water. The coating composition is typically subjected to ambient cure, though accelerated curing is possible.

The coating composition of the present invention may contain additional compositions including without limitation: accelerators/plasticizers such as benzyl alcohol, salicylic acid, and tris-2,4,6-dimethylaminomethyl phenol; fillers such as finely divided minerals including silica, alumina, zirconia, talc, sulfates, $TiO_2$, carbon black, graphite, silicates and the like; other curing agents; other epoxy resins; reinforcing agents; rheology modifiers; solvents; accelerators; surfactants; ultra-violet (UV) stabilizers; antioxidants; wetting agents; solvents; defoamers; toughening agents; and colorants including pigments, dyes, and tints.

Curable coating compositions of the present invention can be un-pigmented transparent clear coats, or pigmented systems for primer, basecoat and topcoat applications. The pigment may be any typical organic or inorganic pigment. Several different pigments may be needed to achieve a desirable color for a particular application. Examples of suitable pigments include without limitation, titanium dioxide, opaque polymers, barytes, clay, calcium carbonate, red iron oxide, CI Pigment Yellow 42, CI Pigment Blue 15, 15:1, 15:2, 15:3, 15:4 (copper phthalocyanines), CI Pigment Red 49:1, CI Pigment Red 57:1 and carbon black.

The resulting coating compositions can be applied onto a substrate using techniques known in the art; e.g. by spraying, brushing, draw-down, roll-coating. The nominal dry film thickness (DFT) of the coating is greater than or equal to 1 mil, preferably greater than or equal to 2 mils, preferably greater than or equal to 2.5 mils and more preferably greater than or equal to 3 mils. 1 mil equals 1/1000 of an inch. Examples of substrates that may be coated include without limitation, plastics, wood, metals such as aluminum, steel or galvanized sheeting, tin-plated steel, concrete, glass, composites, urethane elastomers, primed (painted) substrates, and the like. The coatings can be cured at room temperature or at an elevated temperature in a forced air oven or with other types of heating sources.

The following examples are illustrative of the invention.

EXAMPLES AND EXPERIMENTAL METHODS

Acrylic Copolymers

Xylene was added to a 500 mL 4 neck round bottomed flask, equipped with stir shaft, condenser, thermocouple port and addition ports. A heating mantle was used to bring the temperature of the xylene up to reflux (140° C.). A monomer blend consisting of glycidyl methacrylate (GMA), methyl methacrylate (MMA), 2-ethylhexyl acrylate (EHA), and 2-hydroxyethyl methacrylate (HEMA) was weighed out and mixed in a 500 mL glass jar then divided equally into 50 mL plastic feed syringes with Luer Lock connectors. The initiator, tert-butylperoxyacetate (TBPA, 50% in mineral spirits) was added to a single 50 mL plastic syringe and connected to feed tubing via the Luer Lock connection with long feed needle attachment. A dual syringe pump was used to add monomer mix at a constant feed rate and a single feed syringe pump was used to feed the initiator. The feeds were initiated when the solvent was at reflux. The feed rate time and temperature are dependent on the solvent and the half-life of the initiator. Once feeds were depleted the lines were flushed with small amount of solvent. Run was continued for an additional hour to reduce residual monomer and initiator to acceptable levels. Table 1 shows the acrylic copolymers made.

TABLE 1

Acrylic copolymers

| Acrylic | | GMA | MMA | EHA | HEMA | TBPA | xylene | % solids | Tg ° C. | EEW g/mol epoxy, as measured | EEW g/mol epoxy, on solids |
|---|---|---|---|---|---|---|---|---|---|---|---|
| A1 | Wt % of monomer composition | 50 | 10 | 30 | 10 | | | 75% | −3 | 400 | 300 |
| | grams | 150 | 30 | 90 | 30 | 36 | 88 | | | | |
| A2 | Wt % of monomer composition | 50 | 15 | 35 | 0 | | | 72% | −2 | 400 | 300 |
| | grams | 150 | 45 | 105 | 0 | 36 | 88 | | | | |

Acrylic Copolymer Characterization

GPC

Sample was dissolved 2 mg/mL in tetrahydrofuran (THF); solutions were filtered through 0.2 μm PTFE syringe filter prior to injection. Molecular weight measurements were performed with GPC measured on an Agilent 1100 series with MIXED-D columns (300×7.5 mm) at a flow rate of 1.0 mL/min at 35° C. Agilent refractive index detector is used by Agilent GPC/SEC software. Calibration is performed using 17 narrow PS standards from Polymer labs, fit to a 3rd order polynomial curve over the range of 3,742 kg/mol to 0.580 kg/mol.

EEW

EEW is measured in accordance with ASTM D1652. The epoxy resin is dissolved in methylene chloride and titrated with standardized 0.1N perchloric acid ($HClO_4$) in glacial acetic acid in the presence of excess tetraethyl ammonium bromide (TEAB) in acetic acid. Measurements were performed using a Metrohm 905 titrator and the associated Tiamo titration software configured for EEW determinations.

Percent Solids

Label the bottom of a small aluminum pan, place the pan on a scale and record its weight to the closest 0.0001 gram. Distribute approximately 0.5 g-1.5 g of sample evenly in the pan using a pipette. Record that weight as initial (pan+sample). Place on baking pan and clip down with a binder clip before putting sample in oven, cover resin with about 2 grams of toluene using pipette, then carefully place in pre-heated Class A oven. After 2 hours, remove baking pan and samples from the oven. Tare balance and place sample (and pan) on balance and record final weight, and calculate the solids content by the formula:

Solids %=(Final weight−pan weight)/(initial weight−pan weight)*100

Glass Transition Temperature

The $T_g$ was measured with Differential Scanning calorimetry DSC Q2000 V24.10 in accordance with ASTM D7426 with a sample size of about 5-10 mg. The temperature profiles performed as followed: Isotherm at 10° C. for 5 minutes. Ramp to −50° C. @ 10° C./minute, isotherm for 5 minutes, ramp to 150° C. @ 10° C./minute, isotherm for 5 minutes, Tg was analyzed with TA software.

Viscosity

Viscosity measurements were taken using the Brookfield DV-III Ultra viscometer with the Small Sample Adapter (SSA). The Small Sample Adapter's rheologically correct cylindrical geometry provides extremely accurate viscosity measurements and shear rate determinations. For these samples 9 mL of material was deposited into the cylinder and spindles #31 or #34 were used and the speed was varied to achieve a torque of ~25 Newton meters (N*m). Measurements were reported in unites of centipoises (cP).

Amino-Functional Silicone Resins

Amino-functional silicone resins S1 to S13 are shown in Table 2 and each is a reaction product of a silicone resin and an alcohol-amine Representative silicone resin 51 was prepared by reacting a silicone resin reagent/reactant with an NMR determined structure of $D_{0.337}T^{Cyclohexyl}_{0.010}T^{Ph}_{0.653}$ (OZ=68.64 mol %, FW-126.5 g/mol Si) with 1-amino-2-propanol (Mw=75.11, TCI brand, bp=160° C.); according to the following procedure: A 250 mL 1-neck round bottom flask was loaded with the silicone resin reactant (94.19 g, 0.745 mols Si. 0.511 mols OZ) and 1-amino-2-propanol (16.52 g, 0.220 mols, 0.440 mols NH). The flask was equipped with a magnetic stir bar and a Dean Stark apparatus attached to a water-cooled condenser. The mixture was hazy at room temperature. The mixture was heated at an aluminum block temperature of 140° C. for 2 hours. The amount of volatiles collected in the first hour was 3.35 g and in the second hour was 0.31 g. The reaction mixture turned clear while heating to 140° C. The aluminum block temperature was increased to 180° C. and held at this temperature for 2 hours. The amount of volatiles collected in the first hour was 1.85 g and in the second hour was 0.13 g. The final product was stripped on a rotovapor at an oil bath temperature of 115° C. and at a pressure of ~1 mm Hg.

The resulting product was a clear viscous liquid at room temperature. The isolated yield of the product was 100.9 g and it had a calculated amine hydrogen equivalent weight from $^{13}C$ NMR spectrum of 256 g/mol NH. NMR Analysis of product showed it to be: $D_{0.333}T^{Cyclohexyl}_{0.007}T^{Ph}_{0.660}$ with an OZ content of 61.95 mol % (26.9 mol % OR and 33.5 mol % OMe). The OR and OMe values were calculated from 13C NMR by taking the ratio of the OR integral value and dividing that by the integral value of phenyl groups.

Representative silicone resin S6 was prepared by reacting a silicone resin reagent/reactant derived from alkoxysilanes with ethanolamine; according to the following procedure:

Reagents:
Phenyltrimethoxysilane—Dowsil™ Z-6124 silane (available from Dow, Inc. or an affiliated company)—
Methyltrimethoxysilane—Silastic™ Z-6070 silane (available from Dow, Inc. or an affiliated company), lab distilled; Mw=136.22
Ethanolamine, available from Acros Organics A 250 mL 2-neck round bottom flask was loaded with Phenyltrimethoxysilane (106.28 g, 0.536 mols), Methyltrimethoxysilane (35.96 g, 0.264 mols) and Ethanolamine (12.91 g, 0.21 mols, 0.42 mols NH). A magnetic stir bar was used for mixing and the mixture was heated to an aluminum block temperature of 50° C. DI water (14.83 g, 0.823 mols) was added slowly and the mixture was heated at an aluminum block temperature of 70° C. for 1 hour. The aluminum block temperature was increased to 120° C. and then held at this temperature for 1 hour. The amount of volatiles removed was 55.8 g. The product was stripped on a rotovapor at an oil bath temperature of 80° C., ~1.0 mm Hg, 45 min. The resulting product was a clear viscous liquid at room temperature with a calculated amine equivalent weight from 13C NMR spectrum of 304 g/mol NH. NMR Analysis of product showed it to be: $T^{Me}_{0.300}T^{Cyclohexyl}_{0.010}T^{Ph}_{0.690}$; with an OZ content of 83.4 mol %.

TABLE 2

| | Si Resin and Alcohol-amine Reactants | | | Resulting Amino-functional Si Resin | mol % OR (from amine) | mol % OMe/ OEt | g/mol NH |
|---|---|---|---|---|---|---|---|
| Ex No. | Alkoxy Si Resin Composition | Mol % OZ | Alcohol-amine Source | Si molar fractions | | | |
| S1 | $D_{0.337}T^{Cyclohexl}_{0.010}T^{Ph}_{0.65}$ | 68.64 | 1-amino-2-propanol | $D_{0.333}T^{Cyclohexl}_{0.007}T^{Ph}_{0.660}$ | 26.9 | 33.5 | 256 |
| S2 | $D_{0.337}T^{Cyclohexl}_{0.010}T^{Ph}_{0.65}$ | 68.64 | Ethanolamine | $D_{0.326}T^{Cyclohexl}_{0.007}T^{Ph}_{0.664}$ | 23.5 | 34.3 | 280 |
| S3 | $D_{0.654}T^{Cyclohexl}_{0.005}T^{Ph}_{0.34}$ | 61.99 | Ethanolamine | $D_{0.642}T^{Cyclohexl}_{0.010}T^{Ph}_{0.354}$ | 22.2 | 32.4 | 255 |
| S4 | $D_{0.654}T^{Cyclohexl}_{0.005}T^{Ph}_{0.34}$ | 61.99 | Ethanolamine | $D_{0.635}T^{Cyclohexl}_{0.004}T^{Ph}_{0.361}$ | 18.7 | 18.1 | 289 |
| S5 | $D_{0.654}T^{Cyclohexl}_{0.005}T^{Ph}_{0.34}$ | 61.99 | Ethanolamine | $D_{0.640}T^{Cyclohexl}_{0.003}T^{Ph}_{0.357}$ | 36.1 | 17.4 | 162 |
| S6 | Started from alkoxysilanes— | | Ethanolamine | $T^{Me}_{0.300}T^{Cyclohexl}_{0.010}T^{Ph}_{0.690}$ | 22.7 | 60.7 | 304 |
| S7 | $D_{0.337}T^{Cyclohexl}_{0.010}T^{Ph}_{0.65}$ | 68.64 | Ethanolamine | $D_{0.327}T^{Cyclohexl}_{0.007}T^{Ph}_{0.666}$ | 41.7 | 17.6 | 166 |
| S8 | Started from alkoxysilanes— | | Ethanolamine | $D_{0.003}T^{Me}_{0.638}T^{Cyclohexl}_{0.002}T^{Ph}_{0.666}T^{Ph}_{0.18}$ 1 | | 53.2 | 316 |
| S9 | $D_{0.337}T^{Cyclohexl}_{0.010}T^{Ph}_{0.65}$ | 68.64 | 2-amino-1-butanol | $D_{0.321}T^{Cyclohexl}_{0.011}T^{Ph}_{0.673}$ | 27.3 | 29.7 | 260 |
| S10 | Made from alkoxysilanes | — | 2-amino-1-butanol | $T^{Me}_{0.289}T^{Cyclohexl}_{0.014}T^{Ph}_{0.700}$ | 27.6 | 53.6 | 266 |
| S11 | $D_{0.337}T^{Cyclohexl}_{0.010}T^{Ph}_{0.65}$ | 68.64 | 2-amino-2-methyl-1-propanol | $D_{0.335}T^{Cyclohexl}_{0.010}T^{Ph}_{0.655}$ | 26.4 | 35.7 | 268 |
| S12 | $D_{0.337}T^{Cyclohexl}_{0.010}T^{Ph}_{0.65}$ | 68.64 | 1-amino-2-propanol | $D_{0.338}T^{Cyclohexl}_{0.007}T^{Ph}_{0.655}$ | 25.7 | 34.6 | 266 |
| S13 | $D^{Me2}_{0.010}T^{Me}_{0.990}$ | 71.77 | 1-amino-2-propanol | $D_{0.011}T^{Me}_{0.989}$ | 17.9 | 32.5 | 297 |

Coating Formulation: Clear Coatings

The clear coating compositions of Table 3 were prepared by the following manner the acrylic copolymer was placed in a MAX 40 SpeedMixer™ cup and the amino-functional silicone resin was added and mixed for 2 minutes at 2000 rpm in FlackTek™ DAC150 SpeedMixer™. In formulating the coating compositions, the acrylic copolymer and amino-functional silicone resin are added in an amount to provide an epoxy/NH molar ratio of 1:1.

TABLE 3

| Coating Example | Acrylic Copolymer | Amino-functional silicone resin |
|---|---|---|
| CTG 1 | A1 | S1 |
| CTG 2 | A1 | S2 |
| CTG 3 | A1 | S3 |
| CTG 4 | A1 | S4 |
| CTG 5 | A1 | S5 |
| CTG 6 | A1 | S6 |
| CTG 7 | A1 | S7 |
| CTG 8 | A1 | S8 |
| CTG 9 | A1 | S9 |
| CTG 10 | A1 | S10 |
| CTG 11 | A1 | S11 |
| CTG 12 | A1 | S12 |
| CTG 13 | A1 | S13 |
| CTG 14 | A2 | S12 |
| CTG 15 | A2 | S13 |
| CTG 16 | A1 | DOWSIL ™ 3055 |

DOWSIL™ 3055 is an amine-functional siloxane resin with SiC bonded amine functionality, in contrast to SiOC bonded amine functionality, and is available from Dow, Inc. or an affiliated company.

Draw Down Application Method for Clear Coat Applications

A coating was applied to Q-Panel R-412-I (phosphate treated cold rolled steel) and AL 412 (chromate treated aluminum) panels according to ASTM D4147. The panel was secured on a firm horizontal surface using a magnetic chuck or clamp. A multiple clearance square applicator was used to apply coating to the panel, 5 to 6 mil wet thickness was targeted to achieve the desired dry film thickness of ~2.5 mils.

Coating Application and Test Methods

Spray application: Three types of panels were used in the studies (phosphate treated cold rolled steel (CRS), blasted steel, and chromate treated aluminum panels) the phosphate treated and blasted steel panels were cleaned with either a degreaser or shop solvent prior to being sprayed. Paints were put in disposable spray containers equipped with a 200 μm filter and either a 1.4 mm or a 1.8 mm atomizing head was used. The panels were place on a wire rack and sprayed using conventional, air assisted application with 3M™ Accuspray™ System industrial sprayer. Panels were allowed to cure in the lab at a controlled temperature and humidity of 72° F. and 50% relative humidity.

Dry Time: Coatings were drawn down onto 1"×12" glass substrates with a wet film thickness of 76 micrometers (μm) and set on a BYK drying time recorder. The set-to-touch, tack-free time, and dry hard were measured by dragging a needle through the coating using a BYK drying time recorder according to ASTM D5895-03.

Pendulum Hardness: Pendulum hardness was measured using a Pendulum Hardness Tester from BYK Gardner equipped with a Konig pendulum. The tester was run according to ISO 1522 and set to measure hardness in seconds.

Pencil Hardness

The pencil hardness of a coating film is measured according to the ASTM D3363 method. A coating composition is applied on a glass panel to form a 120 micron thick wet film and cured at room temperature for 7 days. The resultant film is then tested by a Zhonghua pencil. The hardness of the pencil used is 9H, 8H, 7H, 6H, 5H, 4H, 3H, 2H, F, HB, B, 2B, 3B, 4B, 5B, 6B, where 9H is the hardest, 6B is the softest.

Gloss: The 20°, 60°, and 85° gloss of the coatings were measured according to ASTM D-523-89 using a micro-TRI-gloss meter from BYK Gardner.

Haze: Haze in a clear-coat formulation is measured in accordance with ASTM E430 Test Method B with the micro-haze plus meter from BYK. Coatings were drawn down at 76 micrometers on glass panel and measurements were taken over black Leneta chart. Measurements were logarithmic scaling with brightness compensation.

Methyl Ethyl Ketone Double Rub Test: The methyl ethyl ketone (MEK) double rub test was performed according to ASTM D5402 using the semi-automatic MEK Rub Test machine made by DJH DESIGNS INC. The testing continued until the coating was rubbed through to the substrate or a maximum of 200 double rubs were completed without breakthrough.

The performance characteristics of the coating compositions are shown in Tables 4 and 5. Ctg 12 and Ctg 13 as compared to Ctg 14 and Ctg 15 respectively, illustrate the importance of a cure compatibility group (e.g. HEMA) in the acrylic copolymer to provide improved pencil hardness, improved dry time, improved gloss readings, improved hardness and improved MEK Resistance. Tables 4 and 5 illustrate that coating compositions having multi-functionalized acrylic copolymer and amino-functional silicone resin curing agents improves the properties of the coating composition in a cost effective manner Coating properties are improved where the acrylic copolymer has, in polymerized form, epoxy functionalized groups and cure compatibility groups and the amino-functional silicone resin is an alkoxy functional siloxane. Moreover, coating properties are most improved where the amino-functional silicone resins have an alkoxy functional siloxane derived from sterically hindered alcohol-amine precursor moieties or where the alcohol-amine precursor is a secondary or tertiary alcohol.

TABLE 4

| Ctg. Ex No. | ctg Clarity (1-5) | 20° Gloss | 60° Gloss | Thickness (mil) | 1 d hardness (Konig sec) | 7 d hardness (Konig sec) | MEK double rubs | Impact |
|---|---|---|---|---|---|---|---|---|
| Ctg 1 | 4 | 96 | 102 | 3.21 | 33 | 94 | >200 | 60 |
| ctg 2 | 2 | 93 | 99 | 2.58 | 33 | 66 | 171 | 40 |
| Ctg 3 | 5 | 85 | 99 | 2.29 | 9 | 17 | 74 | 140 |
| Ctg 4 | 5 | 88 | 100 | 2.5 | 9 | 22 | 140 | >160 |
| Ctg 5 | 5 | 80 | 98 | 3.17 | 16 | 37 | >200 | 80 |
| Ctg 6 | 1 | 1 | 12 | 3.26 | 43 | 73 | 176 | 20 |

TABLE 4-continued

| Ctg. Ex No. | ctg Clarity (1-5) | 20° Gloss | 60° Gloss | Thickness (mil) | 1 d hardness (Konig sec) | 7 d hardness (Konig sec) | MEK double rubs | Impact |
|---|---|---|---|---|---|---|---|---|
| Ctg 7 | 3 | 70 | 90 | 3.59 | 30 | 58 | >200 | 40 |
| Ctg 8 | 3 | 34 | 55 | 4.32 | 39 | 65 | >200 | 20 |
| Ctg 9 | 1 | 98 | 100 | 3.71 | 8 | 78 | >200 | 20 |
| Ctg 10 | 1 | 80 | 92 | 3.55 | 12 | 100 | >200 | <20 |
| Ctg 11 | 2 | 97 | 101 | 2.98 | 6 | 57 | 146 | 20 |
| Ctg 12 | 5 | 100 | 105 | 3.0 | 34 | 99 | >200 | 40 |
| Ctg 13 | 5 | 74 | 95 | 3.1 | 28 | 87 | >200 | 20 |
| Ctg 14 | 1 | 88 | 94 | 2.6 | 10 | 44 | 107 | Testing discontinued due to poor film quality. |
| Ctg 15 | 2 | 10 | 37 | 2.4 | 14 | 30 | 198 | Testing discontinued due to poor film quality. |
| Ctg 16 | 5 | 102 | 108 | 2.76 | 37 | 84 | >200 | 20 |

TABLE 5

| | | Dry Times (hr) | | | |
|---|---|---|---|---|---|
| Ctg. Ex No. | Pencil Hardness | Set-To-Touch | Tack-Free | Dry-Hard | Dry-Through |
| Ctg 12 | F | 0.6 | 4 | 8 | 20 |
| Ctg 13 | F | 0.4 | 1 | 2 | 9 |
| Ctg 14 | 2B | 1.0 | 20 | >24 | >24 |
| Ctg 15 | 2B | 0.5 | 6 | 18 | >24 |

The invention claimed is:

1. A curable coating composition comprising:
   (1) an amino-functional silicone resin comprising in polymerized form, structural units of:
      (i) $(R_3SiO_{1/2})_a$;
      (ii) $(R_2Si(OR')_xO_{(2-x)/2})_b$;
      (iii) $(RSi(OR')_yO_{(3-y)/2})_c$; and
      (iv) $(Si(OR')_zO_{(4-z)/2})_d$
      wherein each R' is hydrogen, an alkyl group or a functionalized alkyl group, provided that at least 5 mole percent of all R' groups are amine containing groups of the formula: $-R_a-NHR_b$;
      wherein $R_a$ is an alkyl group or an aryl-containing group derived from an amino alcohol and $R_b$ is hydrogen, an alkyl group, or an aryl group;
      wherein a+b+c+d=1.00 (100 mole percent); x is either 0 or 1; y is either 0, 1 or 2; and z is either 0, 1, 2, or 3;
      wherein each R is independently hydrogen, an alkyl group, or an aryl group; and
      the —NH— equivalent mass of the amino-functional silicone resin is from 50 to 750; and
   (2) an acrylic copolymer which has, in polymerized form, epoxy functionalized groups and cure compatibility groups; and
   wherein the coating composition has a molar ratio of amine NH functionality to epoxy functionality in the range of from 0.5 to 1.3;
   wherein the epoxy functionalized groups of the acrylic copolymer are derived from one or more monomers selected from the group of glycidyl methacrylate (GMA), glycidyl acrylate, and mixtures thereof; and
   wherein the acrylic copolymer has an epoxy equivalent weight (EEW) in the range of 200-600.

2. The coating composition of claim 1 having a molar ratio of amine NH functionality to epoxy functionality in the range of from 0.8 to 1.

3. The coating composition of claim 1 wherein at least 20 mole percent of all R' groups of the amino-functional silicone resin are amine containing groups of the formula: $-R_a-NHR_b$.

4. The coating composition of claim 1 wherein from 5 to 42 mole percent of all R' groups of the amino-functional silicone resin are amine containing groups of the formula: $-R_a-NHR_b$.

5. The coating composition of claim 1 wherein the amino alcohol is selected from the group which (a) has steric hindrance around the COH moiety; (b) is a secondary or tertiary alcohol; or (c) mixtures thereof.

6. The coating composition of claim 1 wherein the amino alcohol is 1-amino-2-propanol or 1-amino-2-methylpropan-2-ol.

7. The coating composition of claim 1 wherein the acrylic copolymer comprises in polymerized form, from 2% to 20% cure compatibility group monomer units by weight based on the weight of the total monomer units of the acrylic copolymer.

8. The coating composition of claim 1 wherein the cure compatibility groups of the acrylic copolymer comprise monomer groups, in polymerized form, that contain one or more of alcohol (OH) functionality, a phenolic group, a tertiary amine or an acid group that is either pendant to the backbone or attached as an end group.

9. The coating composition of claim 1 wherein the cure compatibility group is derived from hydroxyethyl methacrylate (HEMA).

10. A coated article comprising one or more layers of a cured coating composition of claim 1.

11. A curable coating composition comprising:
    (1) an amino-functional silicone resin comprising in polymerized form, structural units of:
       (i) $(R_3SiO_{1/2})_a$;
       (ii) $(R_2Si(OR')_xO_{(2-x)/2})_b$;
       (iii) $(RSi(OR')_yO_{(3-y)/2})_c$; and
       (iv) $(Si(OR')_zO_{(4-z)/2})_d$
       wherein each R' is hydrogen, an alkyl group or a functionalized alkyl group, provided that at least 5 mole percent of all R' groups are amine containing groups of the formula: $-R_a-NHR_b$;
       wherein $R_a$ is an alkyl group or an aryl-containing group derived from an amino alcohol and $R_b$ is hydrogen, an alkyl group, or an aryl group;
       wherein a+b+c+d=1.00 (100 mole percent); x is either 0 or 1; y is either 0, 1 or 2; and z is either 0, 1, 2, or 3;

wherein each R is independently hydrogen, an alkyl group, or an aryl group; and the —NH— equivalent mass of the amino-functional silicone resin is from 50 to 750; and (2) an acrylic copolymer which has, in polymerized form, epoxy functionalized groups and cure compatibility groups;

wherein the coating composition has a molar ratio of amine NH functionality to epoxy functionality in the range of from 0.5 to 1.3;

wherein from 5 to 42 mole percent of all R' groups of the amino-functional silicone resin are amine containing groups of the formula: —$R_a$—$NHR_b$; and wherein the acrylic copolymer comprises in polymerized form, 30-60% glycidyl (meth)acrylate monomer units by weight based on the weight of the total monomer units of the acrylic copolymer.

* * * * *